United States Patent
Wittenschlaeger (10) Patent No.: US 10,924,427 B2
(45) Date of Patent: Feb. 16, 2021

(54) HARMONIZED CONTROL PLANES, SYSTEMS AND METHODS

(71) Applicant: Nant Holdings IP, LLC, Culver City, CA (US)

(72) Inventor: Thomas Wittenschlaeger, Flowery Branch, GA (US)

(73) Assignee: Nant Holdings IP, LLC, Culver City, CA (US)

(*) Notice: Subject to any disclaimer, the term of this patent is extended or adjusted under 35 U.S.C. 154(b) by 122 days.

(21) Appl. No.: 16/136,130

(22) Filed: Sep. 19, 2018

(65) Prior Publication Data

US 2019/0052578 A1 Feb. 14, 2019

Related U.S. Application Data

(63) Continuation of application No. 15/097,786, filed on Apr. 13, 2016, now Pat. No. 10,110,509, which is a
(Continued)

(51) Int. Cl.
*H04L 12/28* (2006.01)
*H04L 12/927* (2013.01)
(Continued)

(52) U.S. Cl.
CPC .......... *H04L 47/805* (2013.01); *H04L 41/082* (2013.01); *H04L 41/0893* (2013.01);
(Continued)

(58) Field of Classification Search
CPC ....................................................... H04L 47/805
See application file for complete search history.

(56) References Cited

U.S. PATENT DOCUMENTS 4,982,421 A 1/1991 Kirsch et al.
6,081,525 A 6/2000 Christie et al.
(Continued)

FOREIGN PATENT DOCUMENTS

EP 1089521 A2 4/2001
WO WO-0117170 A2 3/2001
(Continued)

OTHER PUBLICATIONS

Understanding the QFabric Switch Control Plane, https://juniper.net/techpubs/en.sub.--US/junos11.3/topics/concept/control--plane-q-fabric-understanding.html, Apr. 27, 2012, 2 pages, Juniper Networks.
(Continued)

*Primary Examiner* — Guang W Li
(74) *Attorney, Agent, or Firm* — Mintz Levin Cohn Ferris Glovsky and Popeo, P.C.

(57) ABSTRACT

A network switch comprises a plurality of optical physical transport layer resources and a control plane management engine capable of receiving, via a request over a network interface, at least one control plane provisioning policy that maps at least one upper layer resource to at least some of the optical physical transport layer resources. The control plane management engine provisions at least some of the optical physical transport layer resources for use by at least one virtual control plane, which operates according to rules of the control plane provisioning policy. The control plane management engine is configured to manage network traffic among the at least some optical physical transport layer resources and external networking nodes according to the at least one virtual control plane.

22 Claims, 3 Drawing Sheets

Related U.S. Application Data continuation of application No. 14/259,092, filed on Apr. 22, 2014, now Pat. No. 9,363,204.

(60) Provisional application No. 61/814,423, filed on Apr. 22, 2013.

(51) Int. Cl.
  *H04L 12/933* (2013.01)
  *H04L 12/24* (2006.01)
  *H04Q 11/00* (2006.01)

(52) U.S. Cl.
  CPC .......... *H04L 41/20* (2013.01); *H04L 41/5054* (2013.01); *H04L 49/15* (2013.01); *H04Q 11/0066* (2013.01); *H04Q 2011/0084* (2013.01); *H04Q 2011/0086* (2013.01)

(56) References Cited

U.S. PATENT DOCUMENTS

| | | | |
|---|---|---|---|
| 6,611,867 B1 | 8/2003 | Bowman-Amuah | |
| 7,269,185 B2 | 9/2007 | Kirkby et al. | |
| 7,269,348 B1* | 9/2007 | Tse-Au | H04Q 11/0005 398/25 |
| 7,426,580 B2* | 9/2008 | Monga | H04L 41/12 709/217 |
| 7,639,699 B2 | 12/2009 | Tallet et al. | |
| 7,894,334 B2 | 2/2011 | Wen et al. | |
| 7,933,247 B2 | 4/2011 | Gidwani | |
| 8,027,354 B1* | 9/2011 | Portolani | H04L 49/70 370/395.2 |
| 8,102,877 B1* | 1/2012 | Liu | H04L 47/805 370/468 |
| 8,107,476 B2 | 1/2012 | MacLean et al. | |
| 8,151,318 B1 | 4/2012 | DeSanti et al. | |
| 8,335,678 B2 | 12/2012 | Hughes et al. | |
| 8,345,778 B2 | 1/2013 | Kennedy et al. | |
| 8,370,831 B1 | 2/2013 | Eng et al. | |
| 8,514,856 B1 | 8/2013 | Gai | |
| 8,717,895 B2* | 5/2014 | Koponen | H04L 49/00 370/235 |
| 9,158,734 B1 | 10/2015 | Prabhakara | |
| 9,319,336 B2* | 4/2016 | Thakkar | H04L 41/042 |
| 9,479,433 B1* | 10/2016 | Lewis | H04L 45/50 |
| 9,509,637 B1* | 11/2016 | Shekhar | H04L 41/0896 |
| 2002/0109879 A1 | 8/2002 | Wing So | |
| 2003/0117954 A1* | 6/2003 | De Neve | H04L 12/4641 370/230 |
| 2006/0221865 A1* | 10/2006 | Hawbaker | H04L 41/0213 370/255 |
| 2007/0036178 A1 | 2/2007 | Hares et al. | |
| 2008/0049648 A1 | 2/2008 | Liu | |
| 2010/0118740 A1 | 5/2010 | Takacs et al. | |
| 2010/0329247 A1 | 12/2010 | Kennedy et al. | |
| 2011/0032830 A1 | 2/2011 | Merwe et al. | |
| 2011/0083138 A1 | 4/2011 | Sivasubramanian et al. | |
| 2011/0188865 A1 | 8/2011 | Lalonde et al. | |
| 2011/0299534 A1* | 12/2011 | Koganti | H04L 45/00 370/392 |
| 2011/0307716 A1 | 12/2011 | Diab | |
| 2012/0027018 A1 | 2/2012 | Ilyadis | |
| 2012/0086769 A1 | 4/2012 | Huber et al. | |
| 2012/0093030 A1* | 4/2012 | Kim | H04L 45/42 370/254 |
| 2012/0120964 A1 | 5/2012 | Koponen et al. | |
| 2012/0155320 A1* | 6/2012 | Vohra | H04L 49/253 370/254 |
| 2012/0155453 A1* | 6/2012 | Vohra | H04L 41/0823 370/352 |
| 2012/0163189 A1 | 6/2012 | Allan et al. | |
| 2012/0297088 A1 | 11/2012 | Wang et al. | |
| 2013/0028091 A1* | 1/2013 | Sun | G06F 9/5083 370/236 |
| 2013/0107709 A1* | 5/2013 | Campbell | H04L 49/358 370/235 |
| 2013/0148511 A1* | 6/2013 | Banga | H04L 41/082 370/250 |
| 2013/0304841 A1 | 11/2013 | Hummel | |
| 2013/0322445 A1* | 12/2013 | Klein | H04L 12/5692 370/392 |
| 2014/0115137 A1 | 4/2014 | Keisam | |
| 2015/0200873 A1* | 7/2015 | Wittenschlaeger | H04L 45/24 398/48 |

FOREIGN PATENT DOCUMENTS

| | | |
|---|---|---|
| WO | WO-0117313 A1 | 3/2001 |
| WO | WO-2008129388 A2 | 10/2008 |
| WO | WO-2012081852 A2 | 6/2012 |
| WO | WO-2012154751 A1 | 11/2012 |
| WO | WO-2012166139 A1 | 12/2012 |

OTHER PUBLICATIONS https://juniper.net/techpubs/en.sub.--US/junos11.3/topics/concept/control-- plane-q-fabric-understanding.html.

* cited by examiner

HARMONIZED CONTROL PLANES, SYSTEMS AND METHODS

CROSS REFERENCE TO RELATED APPLICATIONS

This application is a continuation of U.S. application Ser. No. 15/097,786, filed on Apr. 13, 2016, which is a continuation of U.S. application Ser. No. 14/259,092, filed on Apr. 22, 2014, which claims the benefit of priority to U.S. provisional application having Ser. No. 61/814,423, filed Apr. 22, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is networking fabric technologies.

BACKGROUND

The following description includes information that may be useful in understanding the present invention. It is not an admission that any of the information provided herein is prior art or relevant to the presently claimed invention, or that any publication specifically or implicitly referenced is prior art.

As networking fabrics have grown in complexity due to their shear scale and number of vendors in the market, the management of such fabrics has also grown in complexity. Complex management causes great inefficiencies within the fabric, which degrades performance (e.g., large latencies, slow reconfiguration, poor resource allocation, etc.). Such inefficiencies often arise when applications (e.g., storage networks, data transport networks, computation fabrics, etc.) request fabric resources at a high layer in the fabric, the data plane for example, that have significant impact on a lower layers of the fabric; the control plane of a transport layer for example. For example, a transport layer could include an optical networking transport layer. As an example, U.S. Pat. No. 8,107,476 to MacLean et al. titled "System and Method for Switching Packet Traffic Over an Optical Transport Network", filed Apr. 2, 2010, describes switching traffic via mappers that map traffic to electrical streams.

Some effort has been directed to reducing inefficiencies through Software Defined Networking (SDN). U.S. Pat. No. 4,982,421 to Krisch et al. titled "Virtual Private Line Service", filed Oct. 27, 1989, is a very early attempt at using SDN and describes assigning terminals private lines to a software defined network where the software define network provides private network services. Further, U.S. patent application 2013/0028091 to Sun et al. titled "System for Controlling Switch Devices, and Device and Method for Controlling System Configuration", filed Feb. 22, 2012, seeks to reduce power consumption on a control plane via software defined networking. Of particular note, Sun is typical in that Sun indicates control planes and data planes should be separated.

Still further effort has been directed to creating hybrid fabrics that aid in handling resource requests. U.S. Pat. No. 6,611,867 to Bowman-Amuah titled "System, Method, and Article of Manufacture for Implementing a Hybrid Network", filed Aug. 31, 1999, describes implementing a hybrid fabric. Network capacity requests are made based on future demands and the hybrid fabric is analyzed to identify network problems. The hybrid fabric is then provisioned in accordance with the problems and the requests. However, Bowman-Amuah focuses on provisioning based on future demand, and does not properly address provisioning across layers in a fabric.

Nevertheless, still further effort has been put forth toward managing across layers of a fabric. European patent application publication EP 1 089 521 to Hobbs et al. titled "Methods and apparatus for controlling communications networks", filed Sep. 25, 2000, describes reconfiguring layer 3 services based on processing data collected from an optical transport layer and packet data layer based on a fuzzy logic control algorithm. U.S. Pat. No. 7,269,185 to Kirkby et al. "Management and Control of Multi-Layer Networks", filed May 22, 2001, describes multiple resource allocation layers capable of managing resources along with conditions for use. The control and management planes communicate with reach other to provide a global view of paths and path costs. Additionally, U.S. patent application 2012/0093030 to Kim et al. titled "Cross Layer Path Provisioning Method and System in Multi Layer Transport Network", filed Oct. 18, 2011, describes an interlock system between a management plane and control plane when provisioning a path. Interestingly, these references also contemplate retaining a distinction among planes within a fabric and fail to provide insight into actual control plane management.

Yet further work has been directed, at least as some level, toward management of a control plane. U.S. patent application publication 2010/0118740 to Takacs et al. titled "System and Method for Identifying Non-Multiple Spanning Tree Protocol Control Planes", filed Oct. 19, 2009, discusses associating identifiers with a specific control plane instance and binding a VLAN identifier to the control plane. U.S. patent 2012/0120964 to Koponen et al. "Network Control Apparatus and Method for Populating Logical Datapath Sets", filed Oct. 7, 2011, describes a logical control plane that includes constructs that allow a control application and its users to specify logical datapath sets within the logical control plane. International application publication WO 2012/154751 to Tomic et al. titled "Flexible Radix Switching Network" filed May 8, 2012, seeks to improve performance in high radix networks through various techniques including providing a unified control plane and a unified management plane. In addition, U.S. Pat. No. 7,894,334 to Wen et al. titled "Hierarchical Redundancy for a Distributed Control Plane", filed Aug. 15, 2008, discusses a distributed control plane that has a plurality of control plane processes instantiated on processors. Another example includes U.S. patent application publication 2001/0188865 to Lalonde et al. titled "Method for Rapid Determination of Lowest Cost Wavelength Routes Through a Photonic Network based on Pre-Validated Paths", filed Feb. 4, 2010, which references instantiating a control plane in a network to facilitate establishing end-to-end connections. U.S. patent application 2012/0297088 to Wang et al. titled "Selective Content Routing and Storage Protocol for Information-Centric Network", filed Nov. 2, 2011, describes distributing content among routers in a VPN according to how a control plane is instantiated.

Even though the above references describe instantiating a control plane, they fail to address key issues related to control plane management. More specifically, the reference seeks to retain a distinction between a control plane and other planes within the fabric. The references fail to appreciate that virtualization of the fabric has given rise to multiple layers or fabric planes, which cause poor performance, inoperability among vendors, increased cost to the consumer, or other major inefficiencies. What is needed is a convergence of among fabric layers or planes rather than a segregation of layers or planes to provide a solution to the problems of inefficiency, cost, or poor performance. Thus there is a great need for system, methods, apparatus, or other technologies that give rise to control plane harmonization so that provisioning of fabric resources can occur from any layer to any layer.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which various fabric planes within a network fabric can be combined to give rise to a harmonized control plane. In one aspect of the inventive subject matter, a control plane management system is presented. The system is capable of instantiating a harmonized control plane that aids in provisioning resources across layers within a fabric. The system comprises a network fabric interface that is configured to couple with a network fabric of interconnected nodes. The interface could include one of the nodes, a port on the node, a device external to the fabric, a service, or other type of interface capable of exchanging data with the fabric. The system further comprises a control plane management engine coupled with the network fabric interface.

The management engine obtains one or more resource profiles related to each of an upper networking layer of the fabric and a lower networking layer of the fabric, and with respect to a portion of the networking nodes of the fabric. The profiles provide information related to the resources available at their respective layers. The lower network resource profile can represent one or more network stack layers (e.g., an application layer, a presentation layer, a session layer, a transport layer, a network layer, and a data link layer). The upper networking layer resource profile can also represent one or more network stack layers (e.g., an application layer, a presentation layer, a session layer, a transport layer, a network layer, and a data link layer).

In some embodiments, the upper networking layer resource profile can represent an aggregation layer of the fabric and the lower networking layer resource profile can represent a physical transport layer of the fabric. The physical transport layer of the fabric can further comprise an optical transport layer. In other embodiments, the upper networking layer resource profile can represent an application layer of the fabric and the lower networking layer resource profile can represent an aggregation layer of the fabric. The application layer of the fabric can further comprise a storage application layer, a computation application layer, a monitoring application layer, an operating system layer, a caching layer, a cloaked layer, a sensing layer, or one or more edge device application.

The management engine constructs a control plane provisioning policy as a function of the upper and lower networking layer resource profiles. The management engine then can instantiate a harmonized control plane, according to the provisioning policy, by creating a harmonized control plane object having rules outlining the responsibilities of the harmonized control plane. In some embodiments, the harmonized control plane can comprise a virtual control plane, an integrated data plane and control plane of the fabric, an integrated management plane and control plane of the fabric, a layer integration mapping module configured to map the upper resources to the lower resources, or a software defined control plane.

The management engine configures the harmonized control plane, according to the control plane provisioning policy, to provision the lower resources associated with the lower networking layer of a portion of the networking nodes based on a request for upper layer resources associated with an upper layer of the portion, thus achieving harmonized layers. The fabric, or at least portions of the fabric, can be configured to operate according to the harmonized control plane via the network fabric interface.

In some embodiments, the control plane management engine can further migrate operation of the harmonized control plane to a different portion the networking nodes of the fabric. In these embodiments, migration of the operation harmonized control plane can be substantially transparent to edge devices utilizing functionality of the harmonized control plane. Furthermore, the control plane management engine can further update the control plane provisioning policy based on a second upper layer resource profile and a second lower layer resource profile of the different portion of the networking nodes of the fabric.

In some embodiments, the control plane management system can engage one or more management functions with respect to the harmonized control plane. For example, the management system can engage in modifying the harmonized control plane, generating an alert, generating a report, logging events, recovering from a fault, securing aspects of the harmonized control plane, deconstructing the harmonized control plane, monitoring performance, configuring the harmonized control plane, allocating resources, coordinating among resources, applying routing rules, loading balance, and providing analytics.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, modules, engines, or other systems formed from computing devices. It should be appreciated that the use of such terms is deemed to represent one or more computing devices having at least one processor configured or programmed to execute software instructions stored on a computer readable tangible, non-transitory medium. For example, a server can include one or more computers operating as a web server, database server, or other type of computer server or engine in a manner to fulfill described roles, responsibilities, or functions. One should appreciate that the disclosed inventive subject matter provides for apparatus capable of configuring a network fabric for end-to-end communications among edge devices.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context as disclosed within this document, the terms "coupled to" and "coupled with" are also used euphemistically to mean "communicatively coupled with" where two or more networked devices are able to exchange data over a communication link.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems and methods that instantiate and manage a harmonized control plane for a network fabric. In some embodiments, the harmonized control plane is used to provision resources across multiple networking layers within the fabric.

The system of some embodiments can include a management engine and a network fabric interface that couples the management engine with a network fabric of interconnected nodes. The interface could be implemented within one of the nodes, a port on the node, a device external to the fabric, a service, or other type of interface capable of exchanging data with the fabric.

The management engine of some embodiments obtains one or more resource profiles associated with each of an upper networking layer of the fabric and a lower networking layer of the fabric where the profiles provide information related to the resources available at their respective network layers. The engine uses the profiles to construct one or more control plane provisioning policies that govern disposition of the resources of the layers. Further, the engine then can instantiate a harmonized control plane according to the provisioning policy by creating a harmonized control plane object having rules outlining the responsibilities of the harmonized control plane.

Figure 1:
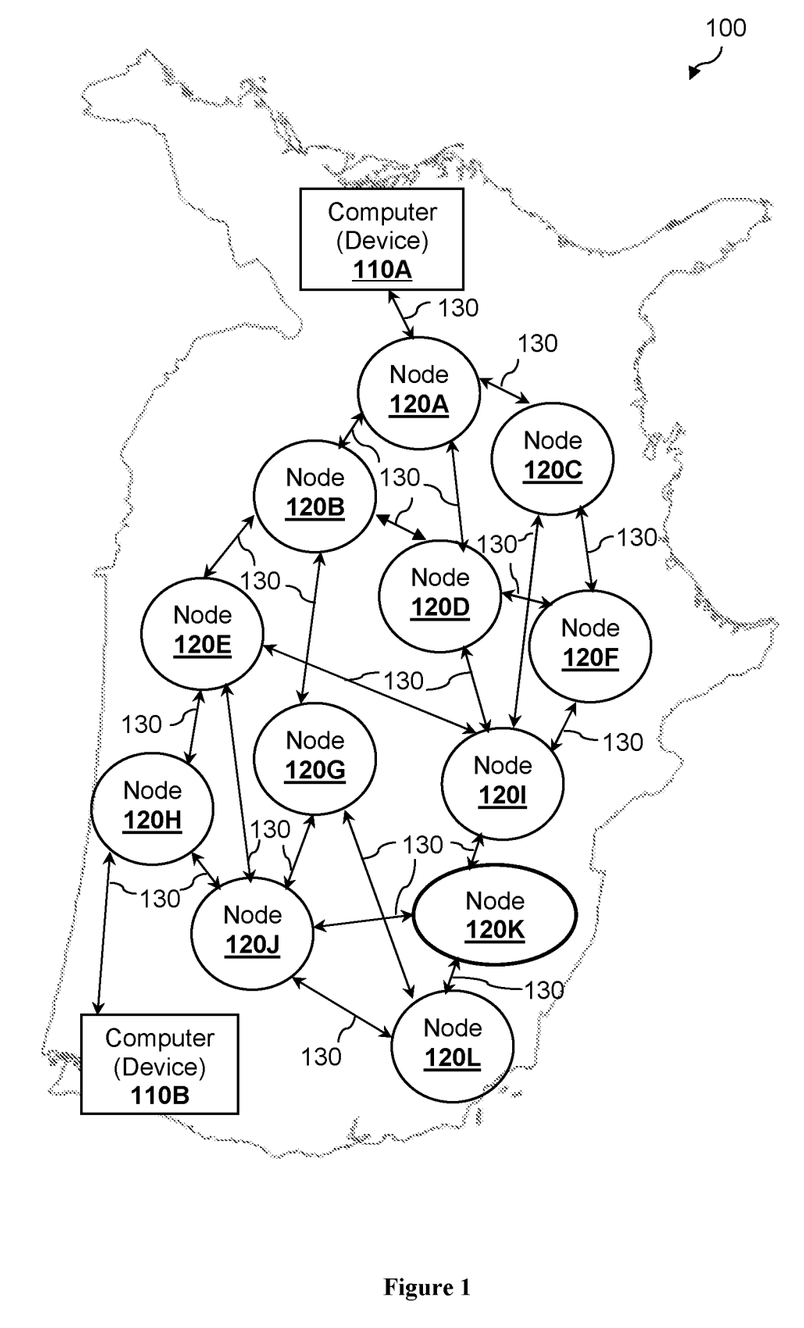
FIG. 1 is an illustration of a network fabric.

FIG. 1 presents example network fabric 100 as a distributed networking fabric comprises a plurality of networking nodes 120 (e.g., nodes 120A through 120L) where fabric 100 can span across geographical distances. Example networking nodes 120 can include networking switches, possibly offered by Cisco, Juniper, or other switch providers. Further, the networking nodes could also include routers, access points, wireless devices, hubs, multi-homed computers, or other types of computing devices capable of routing network traffic. Fabric 100 provides fabric resources (e.g., communication, storage, computation, etc.) for one or more of devices 110 (e.g., devices 110A through 110B). Thus, device 110A can coordinate activities or other communications with device 110B through nodes 120. More preferred fabrics comprise one or more fabric managers as represented by node/fabric manager 120K.

Networking nodes 120 couple with each other via one or more communication links 130. Communication links 130 represent physical fabric communication infrastructure through which data can be exchanged as data signals. In some embodiments, communication links 130 represent electrical connections transporting signals via cables according to one or more physical layer protocols; Ethernet, ATM, PTSN, etc. For example, links 130 could include Ethernet cables. In other embodiments, communication links 130 represent wireless connections based on wireless layer protocols; cellular, WiGIG, 802.11, Bluetooth, etc. Thus, links 130 could include GSM wireless signals or even 2.4 GHz 802.11 signals. Still further, links 130 could include an optical transport layer, optic fibers for example. Example optical transport technologies that can leveraged for use with fabric 100 includes those developed and sold by Ceina Corporation (see URL www.ciena.com), Infinera Corporation (see URL www.infinera.com), Fujitsu, or other optical transport vendors.

One should appreciate that optical transport infrastructure comprises control elements (e.g., amplifiers, filters, aggregators, etc.) that are substantially distinct from the actual networking apparatus; switches for example. Thus, there can be distinct control planes among each layer in the fabric giving rise to inefficiencies referenced previously.

Figure 2:
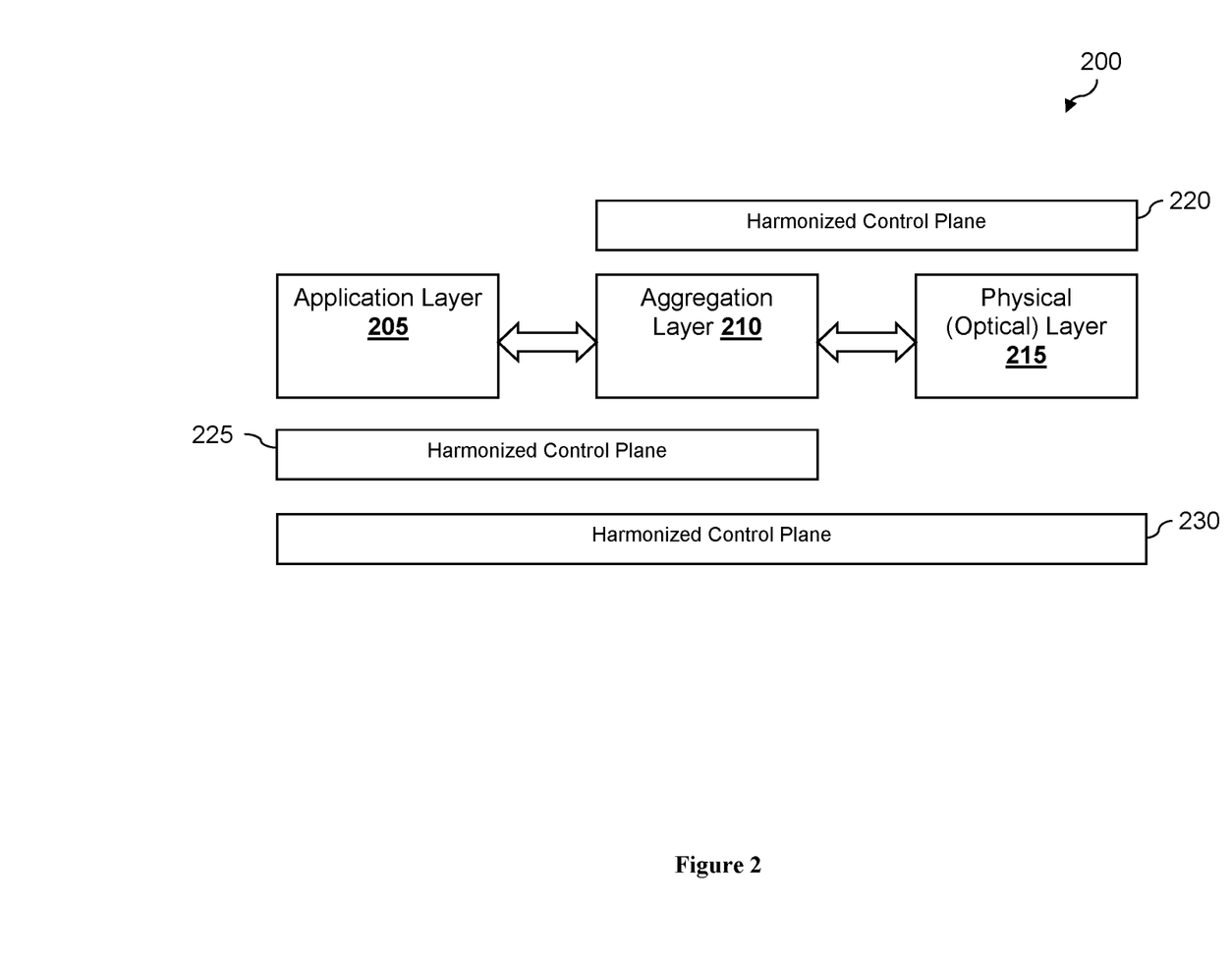
FIG. 2 illustrates fabric plane harmonization across multiple layers in a fabric.

FIG. 2 presents an abstracted representation of a network fabric 200. The fabric 200 is presented as having three layers: the application layer 205, the aggregation layer 210, and physical layer 215. Although illustrated as three layers, one should appreciate the fabric could be represented into other logical forms possibly according to types of application, operating system layers, communication stack layers (e.g., OSI layers), computing architecture layers, or other layers.

The application layer 205 can be considered the highest level of utility of the fabric. Example applications can include storage networks, distributed computing networks, monitoring networks, cloud-based infrastructure, gaming infrastructure, media distribution network, or other type of application infrastructure. Further, the application layer 205 can also be considered to extend from the physical networking infrastructure up through the operating systems of coupled devices and into the application space where applications leverage operating system resources.

The aggregation layer 210 can be considered the packet routing infrastructure that aggregates data from multiple devices from the fabric and routes the data to other devices across the fabric. The routing infrastructure can include switches, routers, intermediary servers, or other devices. The aggregation layer 210 can also handle different mid-level networking functionalities such as formatting, data presentation, session management, streaming support, multiplexing, flow control, link management, encryption, security, authentication, data routing, data forwarding, synchronization functionalities, etc.

The physical layer 215 as discussed previously represents the physical medium by which data is transported (e.g., optical fiber, etc.). Interestingly, each layer of the fabric as presented has been treated distinctly as a different networking plane in the past. For example, known fabrics separate data planes, management planes, control planes, forwarding planes, or other planes, even within the same layer of the fabric. Further, known fabrics will have dedicated planes for each layer. Thus, the aggregation layer 210 would have an aggregation layer control plane and the physical layer 215 would have a physical layer control plane, which results in high management overhead.

The inventive subject matter is considered to include construction of and management of harmonized control planes across layers of the fabric, which is thought to eliminate such high management overhead. One should appreciate that the harmonized control plane can span across various layers as illustrated. For example, harmonized control plane 220 spans across the aggregation layer 210 as well as the physical layer 215. Harmonized control plane 225, on the other hand, spans across the application layer 205 and aggregation layer 210. Further, harmonized control plane 230 spans across all layers of the fabric.

Within the context of this document, a harmonized control plane is considered to be a construct having responsibility for management or application of resource across multiple layers or planes in the fabric.

Figure 3:
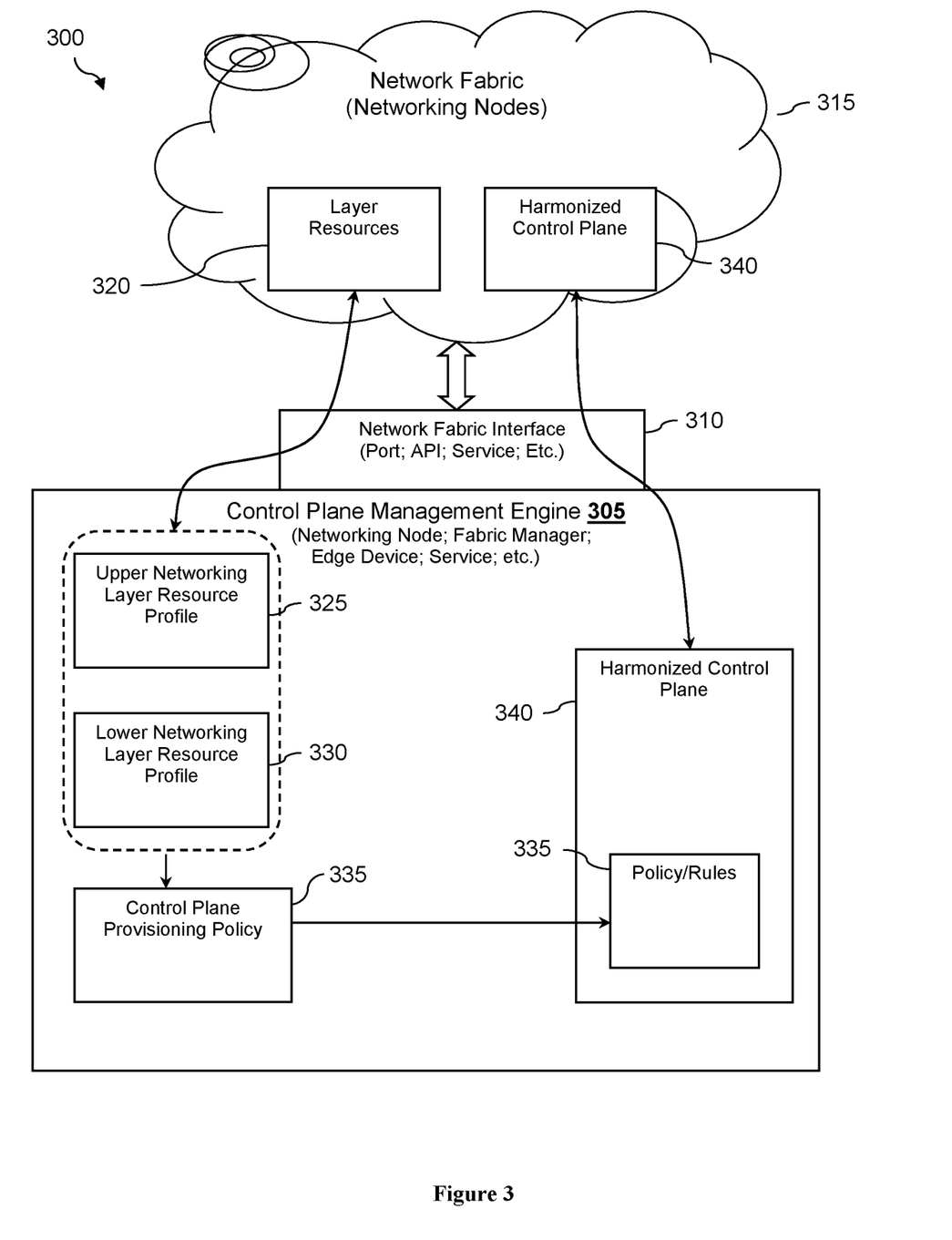
FIG. 3 illustrates a control plane management system.

FIG. 3 provides an illustration of a fabric ecosystem 300 where harmonized control planes are instantiated and deployed throughout a network fabric 315 having one or more layers of resources. For example, the network fabric 315 can have three layers of resources—application layer, aggregation layer, and physical layer—as shown in FIG. 2. Alternatively, the network fabric 315 can follow the OSI model and include seven layers of resources.

Contemplated control plane management system comprises a network fabric interface 310 and a control plane management engine 305. The network fabric interface 310 represents a communication portal to the fabric 315. One should appreciate the interface 310 can be a direct connection with the fabric via a communication link. For example, fabric interface 310 could represent a physical optical port of a network node that couples with the other portions of the fabric 315 by the physical port. In other embodiments, the fabric interface 310 could be a driver or even an application program interface (API) through which an operating system interfaces to the fabric 315. Thus, the fabric interface 310 could be internal to the fabric 315 or external to the fabric 315.

The control plane management engine 305 represents a computing device having roles or responsibilities for management of one or more harmonized control planes. The engine 305 could also be a node of the fabric 315, possibly a fabric manager node (e.g., node 120K of FIG. 1). In alternative embodiments, the control plane management engine 305 could comprise a separate or distinct edge device coupled to the fabric 315.

The fabric 315 can include one or more layers of resources 320 that can be provisioned, dedicated, or allocated to an activity. The layer resources 320 can include resource information of multiple different layers. As an example of layer resources 320, an optical transport layer (i.e., physical layer) could include communication changes or physical link resources characterized by channels, physical fibers, wavelength, polarization, or other attributes. From an application layer perspective, the resources 320 could include latency, bandwidth, quality of service, traffic flow or shape, storage space, computational capability, processing time, memory, or other features. With respect to an aggregation layer resources could include security features, routing techniques, or other resources.

One should appreciate that the layers of the networking fabric 315 can be distinguished by their relative positions with respect to each other. An upper layer is considered more closely related to the application side of the fabric while a lower layer is considered more closely related to the physical transport (e.g., optical fiber).

The management engine 305 can obtain an upper networking layer resource profile 325 related to upper layer resources of the fabric 315 from the fabric 315. The upper layer resource profile 325 represents a description of the resources or attributes of one or more corresponding upper layers of a portion of the networking nodes that compose the network fabric 315. It is noted that the upper layer profile 325 can represent the resources of various network layers. For example, when the fabric 315 is represented by the OSI model, the upper layer profile 325 can include resources and attributes information of one or more of an application layer, a presentation layer, a session layer, a transport layer, a network layer, or a data link layer. Thus, the resource profile 325 could represent the application layer and the aggregation layer of the entire fabric, or just a few nodes.

In a similar vein, the management engine 305 can obtain a lower networking layer resource profile 330 related to lower layer resources of the fabric 315 from the fabric 315. Similarly, the lower layer resource profile 330 represents a description of the resources or attributes corresponding to one or more lower networking layers of the portion of networking nodes. With respect to the OSI model, the lower layer profile 330 could represent resources and attributes of one or more of a presentation layer, a session layer, a transport layer, a network layer, a data link layer, or a physical layer, as long as it is at least below the upper layer. One should appreciate that the layers represented by the upper layer resource profile and layers represented by the lower layer resource profile can be separated by other layers rather than being logically adjacent to each (as long as the upper layers are all closer to the application layer than the lower layers). Thus, the harmonized control plane 340 can short circuit many layers of the fabric.

Once the upper layer resource profile 325 and the lower layer resource profile 330 are received, the management engine 305 compiles a listing of available resources associated with the upper layer and the lower layer, and conditions under which the resources can be utilized based on the profiles. The management engine 305 constructs a control plane provisioning policy 335 as a function of the upper and lower networking layer resource profiles 325 and 330. The policy 335 comprises rules, conditions, or requirements of how resources associated with a corresponding control plane are to be managed. The policy 335 can comprise a layer integration mapping module that maps the upper resources to the lower resources, possibly in the form of a matrix. Such an approach allows for provisioning resources based on a request made to the upper layer by automatically mapping to required lower layer resources without requiring an adaption layer between planes; between a data plane and control plane for example.

As an example, the upper networking layer resource profile 325 could represent an aggregation layer of the fabric and the lower networking layer resource profile 330 could represent a physical transport layer of the fabric, possibly an optical transport layer as illustrated in FIG. 2. In this example, the management engine 305 compiles the resources from the aggregation layer (e.g., session resources, security resources, streaming resources, etc.) and resources from the optical transport layer (e.g., channel attributes, wavelength attributes, bandwidth resources, etc.). The management engine 305 then integrates these two layers by building a matrix to map resources of the aggregation layer to resources of the optical transport layer. For example, the management engine 305 can generate rules/policies 335 to map a particular session to one or more channels, and/or to map a streaming media session to a particular range of wavelengths in the optical fiber link within the fabric 315. The management engine 305 then instantiates a harmonized control plane 340 based on the generated layer mapping policy/rules 335. In this example, the instantiated harmonized control plane 340 spans across the aggregation layer and the physical layer, as shown by the harmonized control plane 220 in FIG. 2.

In another example, the upper networking layer resource profile 325 could represent an application layer of the fabric and the lower networking layer resource profile 330 could represent an aggregation layer of the fabric also illustrated in FIG. 2. Example application layers can include a storage application layer, a computation application layer, a monitoring application layer, an operating system layer, a caching layer, at least one edge device application, a cloaked layer, a sensing layer, a gaming layer, a virtualized server or services layer, or other types of application layers. In this example, the management engine 305 compiles the resources from the application layer (e.g., a storage application, a virtualized server, a gaming application, etc.) and resources from the aggregation layer (e.g., session resources, security resources, streaming resources, etc.). The management engine 305 then integrates these two layers by building a matrix to map resources of the application layer to resources of the aggregation layer. For example, the management engine 305 can generate rules/policies 335 to map the virtualized server to a particular session and/or to particular security resources, and to map a music streaming application to a particular streaming media session. The management engine 305 then instantiates a harmonized control plane 340 based on the generated layer mapping policy/rules 335. In this example, the instantiated harmonized control plane 340 spans across the application layer and the aggregation layer, as shown by the harmonized control plane 225 in FIG. 2.

As mentioned above, the upper layers and the lower layers do not have to be adjacent to each other. As such, in yet another example, the upper layer resource profile 325 can represent resources from the application layer while the lower layer resource profile 330 can represent resources from the optical transport layer. Similar to the examples given above, the management engine 305 here compiles the resources from the application layer (e.g., a storage application, a virtualized server, a gaming application, etc.) and resources from the optical transport layer (e.g., channel attributes, wavelength attributes, bandwidth resources, etc.). The management engine 305 then integrates these two layers by building a matrix to map resources of the application layer to resources of the aggregation layer. For example, the management engine 305 can generate rules/policies 335 to map the virtualized server to a particular physical channel, and to map a music streaming application to a particular range of wavelengths. Because the upper layer and lower layer are not adjacent to each other in this example, the management engine 305 of some embodiments needs to fill-in the gap, by automatically providing the mapping through the intermediate layer (e.g., the aggregate layer in this example).

The management engine 305 then instantiates a harmonized control plane 340 based on the generated layer mapping policy/rules 335. In this example, the instantiated harmonized control plane 340 spans across the application layer, the aggregation layer, and the physical layer, as shown by the harmonized control plane 230 in FIG. 2.

In some embodiments, once the management engine 305 has compiled all the resources from the upper and lower layers, the management engine 305 can provide an interface (e.g., a user interface, a set of APIs, etc.) that enables a user (e.g., a human user, another device, an application, etc.) to configure and/or modify the policies/rules of mapping resources between the layers. In some embodiments, the management engine 305 can configure the harmonized control plane 340 to provision lower resources associated with the lower networking layer of the networking nodes based on a request for upper layer resources. For example, an application could request bandwidth or computational support via an API or through an operating system. The request can be directly translated into an allocation of processors, memory, or even routing algorithms at the aggregation layer. Alternatively, the fabric 315 itself could request blocks of bandwidth at the aggregation layer where the requests become allocations of optic fibers, logical channels (e.g., wavelength, polarization, etc.), or other resources. When the harmonized control plane 340 is acceptably configured to provision resources, the fabric or the appropriate portion of the fabric 315 can be configured to operate according the harmonized control plane 340.

One should appreciate that instantiation of the harmonized control plane 340 can occur within the management engine 305, within a networking node of the fabric 315, a manager node of the fabric 315, or even across multiple nodes of the fabric 315. One can consider the instantiated harmonized control plane 340 as a distinct management object within the ecosystem. The ecosystem can include multiple instantiated harmonized control planes for different portions of the same fabric. For example, the management engine 305 can instantiate a harmonized control plane 220 (that covers the aggregation layer and the physical layer) for nodes 120A, 120B, 120E, and 120H of the fabric 100 in FIG. 1, and instantiate another harmonized control plane 225 (that covers the application layer and the aggregation layer) for nodes 120A, 120C, 120F, 120I, 120K, 120J, and 120H of the fabric 100 in FIG. 1. Thus, it is also possible to have overlapping harmonized control planes (that overlaps layers). In addition, multiple harmonized control planes can be instantiated and deployed to the overlapping nodes within a fabric.

After one or more harmonized control planes 340 have been instantiated, the management engine 305 can deploy the instantiated harmonized control planes 340 to the fabric 315, for example, by disseminating the harmonized control planes 340 (including the policies/rules 335) to the nodes within the fabric 315. In some embodiments, the management engine 305 can disseminate the respective harmonized control planes 340 to only the associated portions of the fabric 315. For example, the management engine 305 can disseminate harmonized control plane 220 to nodes 120A, 120B, 120E, and 120H, while disseminating harmonized control plane 225 to nodes 120A, 120C, 120F, 120I, 120K, 120J, and 120H.

The instantiated harmonized control plane 340 can represent different aspects of the fabric 315. In view that the harmonized control plane 340 is instantiated and deployed, it can be considered as comprising a virtual control plane for the corresponding resources or equipment. Further, as discussed previously, the harmonized control plane 340 can operate as a data plane integrated with a control plane where data flow or forwarding functionality directly maps to control plane resources or algorithmic allocations without requiring intermediary adaption or management layers. Still further, the harmonized control plane 340 can be considered a software defined control plane, possibly having one or more APIs through which an administrator can construct the harmonized control plane 340. For example, a network administrator could leverage a tool such as IBM's Tivoli to construct the provisioning policy and instantiating the harmonized control plane 340, as mentioned above.

The management engine 305 can be further configured to migrate the harmonized control plane 340 from one portion of the fabric to another portion of the fabric as necessary. For example, should a current portion of the fabric fail, a new portion can be interrogated for resource profiles and brought into the fold under the harmonized control plane 340. In the examples given above, when node 120B is detected as failing, the management engine 305 can configure the control plane 220 to include nodes 120D and 120I, instead of node 120B to ensure a persistent connection.

Since the upper/lower resources for the new portion of the fabric 315 (e.g., the replacement nodes and accompanied physical communication links between nodes) can be different, the management engine 305 of some embodiments updates the control plane provisioning policy 335 based on a new set of upper and lower layer resource profiles associated with the new portions of the fabric 315. In view that the migration of the harmonized control plane occurs within the fabric 315, one should appreciate that the migration can occur substantially transparent to edge devices utilizing functionality provided by the harmonized control plane 340.

One should appreciate that the management engine 305 can have additional responsibilities with respect to the harmonized control plane 340. Additional management functions with respect to the harmonized control plane 340 can include modifying the harmonized control plane 340, generating an alert, generating a report, logging events, recovering from a fault, securing aspects of the harmonized control plane 340 or its resources, deconstructing or de-instantiating the harmonized control plane 340, monitoring performance, configuring the harmonized control plane 340, allocating resources, coordinating among resources, applying routing rules, load balancing, providing analytics, or other management functions.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A networking switch comprising:
a plurality of optical physical transport layer resources;
a non-transitory computer readable memory storing virtualized control plane software instructions; and
at least one processor configured to execute the virtualized control plane software instructions to provide a control plane management engine, wherein the control plane management engine is configured to at least:
receive at least one control plane provisioning policy that maps at least one upper layer resource to at least some of the plurality of optical physical transport layer resources;
instantiate at least one virtual control plane by provisioning the at least some of the optical physical transport layer resources for use by the at least one virtual control plane, wherein the at least one virtual control plane operates according to rules of the at least one control plane provisioning policy to configure the at least one virtual control plane to provision at least one lower layer resource based on a request for the at least one upper layer resource; and
manage network traffic among the at least some of the optical physical transport layer resources and external networking nodes according to the at least one virtual control plane.

2. The networking switch of claim 1, wherein the at least one virtual control plane comprises a first virtual control plane configured for a first networking layer and a second networking layer, and a second virtual control plane configured for the second networking layer and a third networking layer.

3. The networking switch of claim 2, wherein the second networking layer comprises a physical layer that includes the at least some of the optical physical transport layer resources.

4. The networking switch of claim 1, wherein the plurality of optical physical transport layer resources includes at least one of the following physical resources: a physical port, a channel, a physical fiber, a wavelength, and a polarization.

5. The networking switch of claim 4, wherein the at least one virtual control plane is instantiated as a function of the at least one of the physical resources.

6. The networking switch of claim 1, wherein the at least one upper layer resource includes at least one of the following: an application layer resource and an aggregation layer resource.

7. The networking switch of claim 6, wherein the at least one virtual control plane is instantiated as a function of at least one of the following application layer resources: a latency, a bandwidth, a quality of service, a traffic flow, and a traffic shape.

8. The networking switch of claim 6, wherein the at least one virtual control plane is instantiated as a function of at least one of the following aggregation layer resources: a security resource and a routing technique.

9. The networking switch of claim 1, wherein the control plane management engine is further configured to at least update the at least one virtual control plane based on an updated upper layer resource profile associated with the at least one upper layer resource or an updated lower layer resource profile associated with the plurality of optical physical transport layer resources.

10. The networking switch of claim 1, wherein the rules of the at least one control plane provisioning policy include at least one of the following:
routing rules, load balancing rules, resource allocation rules, session mapping rules, virtual server rules, physical channel rules, and wavelength rules.

11. A computer readable media product comprising a physical, non-transitory computer readable memory storing software instructions that cause, via execution, at least one processor in a networking switch to provide a control plane management engine, wherein the control plane management engine is configured to at least:
receive at least one control plane provisioning policy mapping at least one upper layer resource to at least some of a plurality of optical physical transport layer resources of the networking switch;
instantiate at least one virtual control plane by provisioning the at least some of the optical physical transport layer resources for use by the at least one virtual control plane, wherein the at least one virtual control plane operates according to rules of the at least one control plane provisioning policy to configure the at least one virtual control plane to provision at least one lower layer resource based on a request for the at least one upper layer resource; and
manage network traffic among the at least some of the optical physical transport layer resources and external networking nodes according to the at least one virtual control plane.

12. The computer readable media product of claim 11, wherein the at least one virtual control plane comprises a first virtual control plane configured for a first networking layer and a second networking layer, and a second virtual control plane configured for the second networking layer and a third networking layer.

13. The computer readable media product of claim 12, wherein the second networking layer comprises a physical layer that includes the at least some of the optical physical transport layer resources.

14. The computer readable media product of claim 11, wherein the plurality of optical physical transport layer resources includes at least one of the following physical resources: a physical port, a channel, a physical fiber, a wavelength, and a polarization.

15. The computer readable media product of claim 14, wherein instantiating the at least one virtual control plane includes instantiating the at least one virtual control plane as a function of the at least one of the physical resources.

16. The computer readable media product of claim 11, wherein the at least one upper layer resource includes at least one of the following: an application layer resource and an aggregation layer resource.

17. The computer readable media product of claim 16, wherein instantiating the at least one virtual control plane includes instantiating the at least one virtual control plane as a function of at least one of the following application layer resources: a latency, a bandwidth, a quality of service, a traffic flow, and a traffic shape.

18. The computer readable media product of claim 16, wherein instantiating the at least one virtual control plane includes instantiating the at least one virtual control plane as a function of at least one of the following aggregation layer resources: a security resource and a routing technique.

19. The computer readable media product of claim 11, wherein the control plane management engine is further configured to at least update the at least one virtual control plane based on an updated upper layer resource profile associated with the at least one upper layer resource or an updated lower layer resource profile associated with the plurality of optical physical transport layer resources.

20. The computer readable media product of claim 11, wherein the rules of the at least one control plane provisioning policy include at least one of the following: routing rules, load balancing rules, resource allocation rules, session mapping rules, virtual server rules, physical channel rules, and wavelength rules.

21. A networking switch comprising:
a plurality of optical physical transport layer resources;
a non-transitory computer readable memory storing virtualized control plane software instructions; and
at least one processor configured to execute the virtualized control plane software instructions to at least:
receive at least one control plane provisioning policy that maps at least one upper layer resource to at least some of the plurality of optical physical transport layer resources;
instantiate at least one virtual control plane by provisioning the at least some of the optical physical transport layer resources for use by the at least one virtual control plane, wherein the at least one virtual control plane operates according to rules of the at least one control plane provisioning policy to configure the at least one virtual control plane to provision at least one lower layer resource based on a request for the at least one upper layer resource; and
manage network traffic among the at least some of the optical physical transport layer resources and external networking nodes according to the at least one virtual control plane.

22. A computer-readable non-transitory storage medium including instructions which,. when executed by one or more processors, cause operations comprising:
- receiving at least one control plane provisioning policy mapping at least one upper layer resource to at least some of a plurality of optical physical transport layer resources of a networking switch;
- instantiating at least one virtual control plane by provisioning the at least some of the optical physical transport layer resources for use by the at least one virtual control plane, wherein the at least one virtual control plane operates according to rules of the at least one control plane provisioning policy to configure the at least one virtual control plane to provision at least one lower layer resource based on a request for the at least one upper layer resource; and
- managing network traffic among the at least some of the optical physical transport layer resources and external networking nodes according to the at least one virtual control plane.hysical channel rules, and wavelength rules.

* * * * *

UNITED STATES PATENT AND TRADEMARK OFFICE
CERTIFICATE OF CORRECTION

PATENT NO. : 10,924,427 B2
APPLICATION NO. : 16/136130
DATED : February 16, 2021
INVENTOR(S) : Thomas Wittenschlaeger It is certified that error appears in the above-identified patent and that said Letters Patent is hereby corrected as shown below:

In the Claims

Column 15, Line 2, Claim 22, after "instructions" delete "which,." and insert --which,--

Column 15, Lines 20-21, Claim 22, delete "hysical channel rules, and wavelength rules."

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*